Jan. 15, 1963
V. G. MAGORIEN
3,073,342
AIRLESS COUPLING
Filed Oct. 5, 1959
2 Sheets-Sheet 1
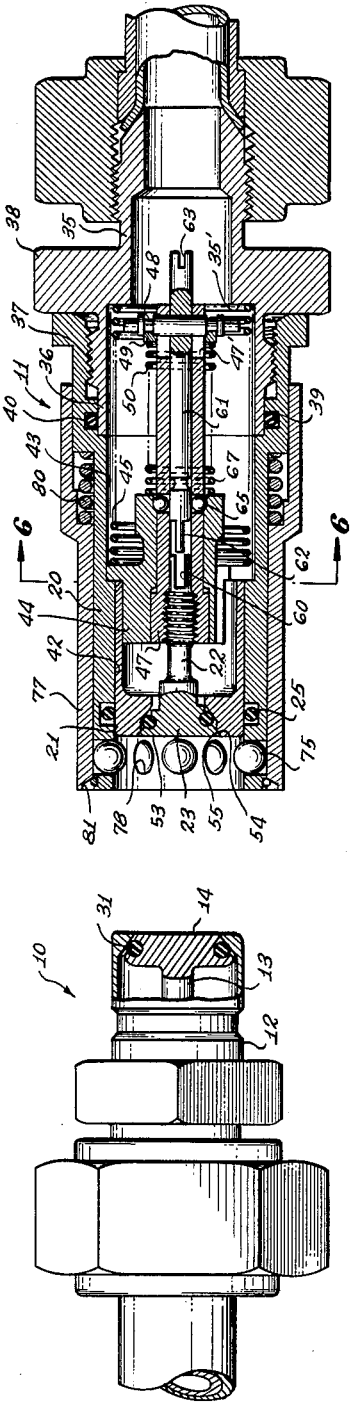
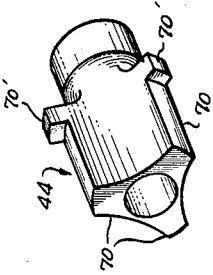
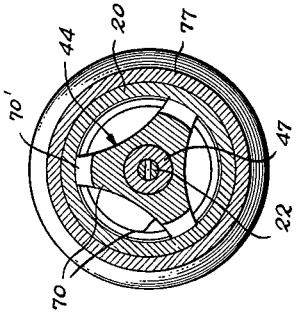
INVENTOR.
VINCENT G. MAGORIEN
BY
Attorneys Jan. 15, 1963 V. G. MAGORIEN 3,073,342
AIRLESS COUPLING
Filed Oct. 5, 1959 2 Sheets-Sheet 2
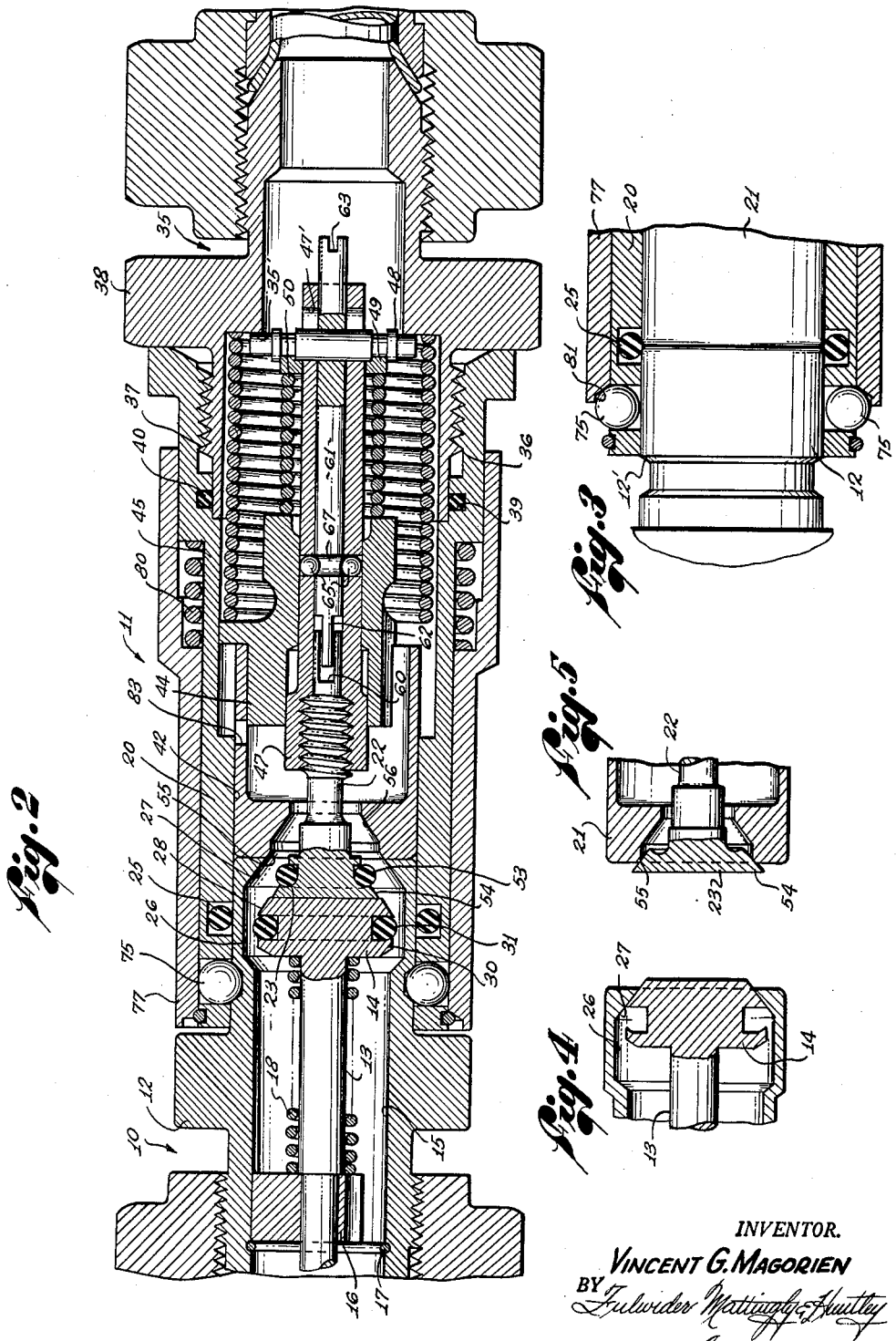
INVENTOR.
VINCENT G. MAGORIEN
BY Fulwider Mattingly & Huntley
Attorneys

United States Patent Office 3,073,342
Patented Jan. 15, 1963

3,073,342
AIRLESS COUPLING
Vincent G. Magorien, Reseda, Calif., assignor to Seaton-Wilson Manufacturing Company, Burbank, Calif., a corporation of California
Filed Oct. 5, 1959, Ser. No. 844,414
6 Claims. (Cl. 137—614.03)

This invention relates to coupling devices, and more particularly to an improved coupling for fluid carrying lines.

As is well known, there are many types of fluid handling apparatus, wherein a source of fluid under pressure and apparatus for handling or being operated by the fluid must occasionally be connected and disconnected. Typical of such systems are hydraulic systems employing oils of various types, and gaseous systems for handling fuels and the like.

Due to the nature of the system or the characteristics of the fluid used, the situation often is one in which absolutely no entrapment of air within the fluid lines being connected, and no spillage of fluid upon disconnecting the lines, can be tolerated. For example, hydraulic fluids may become contaminated or decomposed as a result of air or moisture entrapment. Air entrapment in a hydraulic system may materially alter its response rate, so that its operation is sluggish or "spongy." The same is true of the loss of fluid from the system. And in the case of lines that carry fuels extremely harmful to surrounding personnel or materials, it is obviously desirable that absolutely none of such fluids be spilled, as on disconnecting the coupling.

In the past, efforts have been made to develop a coupling device which overcomes these difficulties. However, all known prior art coupling devices are uniformly characterized by a failure to eliminate the possibility of air entrapment or fluid spillage. And so long as there is any possibility at all of moisture or air entrapment upon connecting fluid lines, and fluid spillage upon disconnecting the lines, couplings for such lines are far from satisfactory.

It is accordingly an object of this invention to provide a coupling for connecting fluid lines without the possibility of any air or moisture being entrapped in either line when they are connected together.

It is another object of this invention to provide an improved coupling for fluid lines which operates, upon disconnecting the lines, to eliminate the possibility of any fluid in either of the lines being spilled.

A further object of this invention is to provide a unique quick disconnect coupling for fluid lines which eliminates all hazards connected with the coupling and decoupling of fluid lines, and which comprises a minimum number of component parts of simple design and rugged construction.

The above and other objects and advantages of this invention will become apparent from the following description, taken in conjunction with the accompanying drawings of a preferred embodiment thereof, in which:

FIGURE 1 is a longitudinal sectional view of male and female valve assemblies of my invention, prior to connecting them together;

FIGURE 2 is an enlarged longitudinal sectional view of the male and female assemblies coupled together to place a pair of lines in fluid communication;

FIGURE 3 is a partial sectional view of the abutting ends of the valve assemblies in the initial portion of their travel, showing how the mating faces of the couplings and sealing means cooperate to eliminate the possibility of air entering either of the couplings;

FIGURE 4 is a partial sectional view of the abutting ends of the housing and valve head of the male assembly preparatory to machining to obtain the desired flush relationship;

FIGURE 5 is a partial sectional view of the abutting ends of the female assembly preparatory to machining to obtain the desired flush relationship;

FIGURE 6 is a sectional view taken along the lines 6—6 of FIGURE 2 showing the configuration of the carriage guide to permit fluid to flow between its ends;

FIGURE 7 is a perspective view of the carriage guide showing more clearly how its dimensions vary along its length; and FIGURE 8 is a perspective view of the retainer element in the male housing for the male valve stem.

Referring to FIGURE 1, a coupling apparatus is shown which comprises a male valve assembly 10 and a female valve assembly 11. The male valve assembly 10 has a housing 12 within which is a slidable valve stem 13 having an enlarged valve head 14 centrally located in a bore 15 in the housing 12.

The position of the valve head 14 is such that its outer face is exactly flush with the surrounding face of the housing 12. Furthermore, the valve head 14 within the housing 12 is larger than the diameter of the bore 15 at the face of the housing 12. Thus, the valve head 14 can move inwardly of the housing 12, but not outwardly past the flush face thereof, i.e., only to the left in FIGURE 1.

To aid in such movement, the stem 13 is guidably supported within a web element 16, which is positioned in the housing by means of a snap-ring 17. A compression spring 18 is located between the web element 16 and the valve head 14. Thus, the spring 18 normally biases the valve head 14 forwardly, so that its outer face is normally in precisely the same plane as the end of the housing 12. The valve 14 will move inwardly in response to a force, applied to the outer face thereof, that overcomes the force of the spring 18.

The female valve assembly 11 has a main body 20 which is adapted to receive the end of the male housing 12. Slidably disposed within the body 20 is a poppet 21, within which a valve stem 22 is located. The valve stem 22 at its outer end is enlarged to provide a valve head 23, the outer surface of which is exactly flush with the outer surface of the poppet 21, i.e., the external end faces of the poppet 21 and the valve head 23 are normally in the same plane.

The arrangement of the poppet 21 and valve head 23 is the reverse of that of the valve head 14 and the surrounding end of the housing 12 of the male valve assembly 10. In other words, the valve head 23 is of a diameter that is greater than that of the surrounding portion of the poppet 21 within which the valve head 23 is located. Thus, the valve head 23 cannot move inwardly of the poppet 21. As will be seen, the relative movement between the poppet 21 and the valve head 23 is such that the poppet 21 is moved rearwardly of the valve head 23, i.e., to the right in FIGURE 1.

In the normal position of the poppet 21, it is surrounded by a suitable seal, e.g., an O-ring 25 that is under compression, to prevent fluid or air passing between the O-ring 25 and the lateral surface of the poppet 21 engaged thereby. The portion of the male housing 12 inserted within the body 20 is of the same diameter as the poppet 21, i.e., the inner diameter of the body 20 in the vicinity of the O-ring 25. With this arrangement (see FIGURE 3), the end of the housing 12 is inserted within the body 20 so that the flush ends of the housing 12 and the valve head 14 are placed in abutment with the flush ends of the poppet 21 and the valve head 23. By virtue of the carefully machined and highly polished surfaces of all of these elements, it will be seen that upon placing them together, all air is displaced, or occluded, from between them, and no air can enter between such abutting faces.

When the male valve housing 12 is inserted within the body 20, forcing the housing 12 inwardly results in the unitary movement of all the abutting parts until they have passed the O-ring 25. Since the O-ring 25 is under compression, it first wipes the lateral surface of the poppet 21 as it is forced past it to the right. When the abutting surfaces of the housing 12, and the poppet 21, together with their valve heads 14, 23, are aligned with the O-ring, any annular void or relief between the outer peripheries of the housing 12 and the poppet 21 is filled by the O-ring 25. Since the O-ring is under compression, it flows inwardly to fill any such depression that passes thereunder (see FIGURE 3). Upon further movement of the elements to the right, the O-ring is in wiping engagement with the lateral surface of the housing 12. Thus, my invention has the unique advantage in that it eliminates substantially all possible ways in which air and moisture might enter the hydraulic system through the valve assemblies.

As will be appreciated, the reverse of the above described movements of the housing 12 and the poppet 21, together with the valve heads therein, as upon disconnecting the coupling elements, operates to prevent any fluid from passing out of the assemblies around the lateral surfaces of the housing 12 and the poppet 21.

In the male coupling assembly, the normal position of the valve head 14 is such that the assembly is self-sealing. Such self-sealing is accomplished in part by the arrangement of mating surfaces on the valve head 14 and the interior of the housing 12. As shown, the bore 15 in the housing 12 is shown to be cylindrical throughout most of its length, and to have an enlarged diameter section adjacent its right-hand end that terminates in a conical taper, as at 27, to a central opening of minimum diameter at the end face of the housing 12. The outer face of the valve head 14 is of the same diameter as the minimum diameter portion of the bore 15 at the end of the housing 12, and the valve head body tapers outwardly and rearwardly, as at 28, at the same angle as the conical section 27.

As shown, the valve head 14 has a peripheral groove 30 within which a suitable seal, shown as an O-ring 31, is locked. In the normal position of the valve head, as shown in FIGURE 1, the conical portions 27 and 28 are in abutment, and the O-ring 31 is also in engagement with the conical portion 27 of the bore 15. For self-sealing purposes, the spring 18 exerts a force against the valve head 14 to deform the O-ring 31 sufficiently so that it is in firm seal engagement with the conical portion 27 of the housing 12. Further, the spring 18 compresses the O-ring 31 sufficiently to ensure that the conical shoulder 28 is in abutment with the conical portion 27 of the bore, and the end face of the valve head 14 is flush with the end face of the housing 12.

The female valve assembly 11, which is also arranged to be self-sealing, will now be described in greater detail. Referring to FIGURE 1, the body 20 is arranged to be secured at its right-hand end to a bushing 35, and to this end the bushing 35 has an externally threaded boss 36 projecting within the body 20 and threadedly secured thereto, as indicated at 37. The bushing 35 is provided with a flange 38, of greater dimension than the end of the body 20, to provide means having a mechanical advantage for turning the bushing 35 into the body 20. The bushing 35 is turned until the adjacent end of the body 20 abuts the adjacent surface of the flange 38.

As shown, the body 20 is provided with an annular groove 39 that contains a seal, shown as an O-ring 40, such seal being compressed within the groove 39 when the bushing is threaded into the sleeve. The seal 40 prevents leakage of any fluid through the threads 37 and out of the assembly between the abutting portion of the body 20 and the flange 38, and also prevents entrapment of air in the threads.

The bore of the body 20 has a minimum diameter portion 42 in which the poppet is slidably disposed, and immediately adjacent thereto is an enlarged diameter portion 43 of approximately the same length as the minimum diameter portion 42. As shown, the inner diameter of the boss 36 is substantially the same as the diameter of the enlarged opening portion 43. Slidably disposed within the larger diameter portion 43 within the body 20 is a guide element 44, a compression spring 45 disposed between the bushing 35 and the guide 44 urges the guide against the right-hand end of the poppet 21, thereby to normally keep poppet 21 in an extreme left-hand position.

The valve stem 22 has a threaded portion a short distance from the valve head 23 for securing the stem 22 in one end of sleeve 47 slidably supported in the guide 44. As shown, one end of the sleeve 47 is disposed within the guide 44, and at its opposite end the sleeve 47 extends into the boss 36. A rod or pin 48 extends through a slot 49 in the sleeve 47, and a lock-washer 49 is located in undercut portions of the pin 48. A spring 50 has its ends in abutment with the lock-washer 49 and the adjacent portion of a guide 44, whereby to urge the guide 44 and the lock-washer 49 apart. This means that the pin 48 is urged away from the guide 44, whereupon the sleeve 47 and the valve stem 22 are urged to the right in FIGURE 1. The action of the spring 50 results in the valve head 23 being forcibly held in a position so that its outer face is flush with the outer face of the poppet 21.

As shown, the valve head 23 has a peripheral groove 52 in which is located a seal, shown as an O-ring seal 53. The shoulder portion of the valve head 23 (on the left of the groove 52 as seen in FIGURE 1) is conical, the portion of the greatest diameter being flush with the outer face of the poppet 21. The shoulder 54 is in solid contact with a mating conical portion 55 of the poppet. The portion of the poppet 21 surrounding the valve head 23 has another conical portion 56 axially spaced from the conical portion 55.

The conical portion 56 of the poppet tapers inwardly to the right in FIGURE 1, so that the portion thereof of smallest diameter is smaller than the O-ring 53; thus, the O-ring 53 cannot move past the conical portion 56 to the right. Due to the action of the spring 50, the force with which the valve head 23 is held within the poppet 21 is sufficient to cause the O-ring 53 to compress against the conical portion 56 and thereby form an effective seal simultaneously, the conical portions 54, 55 of the poppet and valve head are in abutment, and their faces are flush.

My invention incorporates means for initially properly seating the conical shoulder 54 of the valve head 23 against the inner conical face 55 of the poppet. To this end, the inner end of the valve stem 22 is provided with a transverse groove 60, and a shaft 61 is slidably disposed within the sleeve 47 that has a tang or tongue 62 to fit within the groove 60. The shaft 61 at its opposite end extends through the sleeve 47, and is provided with a slot 63 to receive the end of a tool, such as a screwdriver.

The pin 48 is secured in the shaft 61, so as to move therewith. However, before the pin 48 is secured to the shaft, the shaft 61 is turned in the sleeve 47, as by means of a screwdriver inserted in the slot 63, to cause the valve stem 22 to be threaded into the sleeve 47 until the end faces of the valve head 23 and the poppet 21 are in the same plane.

As shown in FIGURE 1, the ends of the pin 48 are normally spaced from the radial shoulder 35' of the bushing 35 that extends inwardly from the boss 36. Thus, the shaft 61 can move to the right until the pin 48 abuts the shoulder 35'. To effect such movement, the sleeve 47 is provided with the plurality of openings in which ball elements 65 are located.

With reference to the assembly in which the valve head and poppet face are made flush, the bottoming action is effected with the guide 44 in place. The balls 65 aid in clamping the poppet 21 between the valve head 23 and the guide 44. As will be seen, this adjustment in initial assembly eliminates the possibility of any axial movement of the poppet relative to the valve head 23 that could permit leakage.

In the normal position of the elements as shown in FIGURE 1, the balls 65 are held against the periphery of the shaft 61 immediately adjacent to the tongue 62. In this connection, the diameter of the balls is greater than the wall thickness of the sleeve 47. The major portion of the central opening in the guide 44 is of a diameter equal to the outer diameter of the main body of the sleeve 47; however, the bore of the guide 44 is enlarged at its inner end, as indicated at 66, to a diameter substantially equal to the combined diameters of the shaft 61 and a pair of diametrically opposed balls 65.

In these relative positions of the guide 44 and the sleeve 47 (as shown in FIGURE 1), there can be no relative movement between the guide and the sleeve 47. However, a short distance from the inner end of the guide 44, the shaft 61 is provided with an annular groove 67 into which the balls move upon movement of the sleeve 47 (with the guide 44) to a position wherein the balls are adjacent the groove 67. How this is accomplished will be more clearly explained hereafter in describing the operation of the various elements in securing the devices together.

As previously mentioned, the guide 44, in the normal position of the female coupling assembly, cooperates with the spring 45 to hold the poppet 21 in an extreme left-hand position wherein the seal 25 engages the lateral surface of the poppet. The guide 44 (see FIGURES 6 and 7 along with FIGURE 1) has a main body portion wherein the perimeter is in the form of an equilateral triangle having its sides bowed toward the center thereof, and wherein the adjoining sides are truncated. As shown, the connecting portions between such sides are curved to match the circumference of the inner wall of the poppet 21.

Within the bore section 43, the legs 70 are provided with extensions 70', the outermost surfaces of which are rounded to match the circumference of the bore section 43. The innermost end of guide 44, i.e., inwardly of the extensions 70', is a portion of reduced diameter to provide ample clearance for installing the spring 45 within the body 20 with one end abutting the extensions 70'.

As will be seen in FIGURE 1, the normal position of the guide 44 is one in which the extensions 70' are in abutment with the radial transition between the bore section 43 and the bore 42. Accordingly, since the inner end of the poppet 21 abuts the guide 44, inner movement of the poppet 21, i.e., to the right, effects movement of the guide 44 therewith.

As previously mentioned in connection with FIGURE 3, the end of the male housing 12 is used to force the poppet 21 to the right. It is of course necessary, after completing the coupling, that the parts be locked together. Referring to FIGURE 2, along with FIGURE 1, such locking is effected by means of a plurality of ball elements 75 in the female housing assembly 11, and which are lodged in a groove 12' in the lateral surface of the male housing 12.

It will be seen to be necessary that the balls 75 be moved radially outwards, from the positions shown in FIGURES 1 and 2, in order to insert the male housing 12 into the body 20. To this end, the body 20 is surrounded by a spring-biased sleeve 77 which at its outer end normally surrounds the balls 75 and holds them in position wherein innermost portions thereof extend through openings 78 in the body 20 adjacent the outer end thereof. The sleeve 77 is held in this position by means of a spring 80 surrounding the body 20 and in abutment at its ends with respective shoulder portions of the body 20 and the sleeve 77.

The sleeve 77 is adapted to be retracted to a point where its outer end is approximately centered with the annular row of opening 78 in which the balls 75 are disposed. The inner surface of the end of sleeve 77 is undercut sufficiently as at 81, to provide space into which the balls may be cammed by the housing 12 when it is inserted in the body 20. To permit this, the sleeve 77 is held in the retracted position until the annular depression in the housing 12 is aligned with balls 75. Thereupon, release of the sleeve 77 permits the spring 80 to thrust it forward to the position shown in FIGURE 2, whereupon the balls 75 are held by the sleeve 70 so that their inner portions project into the annular depression 12' of the housing 12.

Prior to the time that the balls 75 are in locking position, the various parts heretofore described undergo synchronized movements, so that fluid lines coupled to the bushing 35 and the housing 12 will be in fluid communication. Due to the combined effects of the springs 18, 45, 50, the abutting surfaces of the housing 12 and poppet 21, together with the valve heads 14, 23, remain in flush engagement until they are past the O-ring seal 25. The guide 44 moves with the poppet 21, and, since the balls 65 carried by the sleeve 47 are locked between the shaft 61 and the guide 44, such movement of the guide cams the sleeve 47 rearwardly. After the seal 25 has engaged the male housing 12, continued rearward movement causes the sleeve, acting through the spring 50, to move the pin 48 against the shoulder 35'. Since the pin 48 is secured to the shaft 61, movement of the shaft 61 ceases at this point.

The poppet 21 and the guide 44 continue to move the sleeve 47 until the balls 65 enter the groove 67 in the shaft 61. When this happens, the rearward movement of the sleeve 47 is stopped. It will be noted that, as soon as the balls 65 roll into the groove 67, any further inward movement of the poppet 21 effects a separation of the poppet from the valve head 23. This separation is further increased due to continued movement of the poppet, the guide 44 and the sleeve 47 until the balls 65 drop into the groove 67. Thereafter, the valve heads 14, 24 are stationary, so that continued movement of the housing 12, the poppet and the guide 44 results in the large diameter portion of the bore 15 being positioned about the valve heads, thereby placing the lines connected to the valve assemblies in communication. In these positions of the various parts (see FIGURE 2), the locking balls 75 are in the groove 12'.

FIGURES 4 and 5 illustrate how I obtain absolute assurance that the end faces of the housing 12 and the valve head 14, and of the poppet 21 and the valve head 23, lie in the same planes. Initially the valve heads extend beyond the faces of the housing 12 and the poppet 21. With the valve heads held in these positions, both the housing and the valve head are machined simultaneously, as along the dotted lines indicated, and then are highly polished simultaneously. Therefore, since each valve head and its surrounding housing are machined and polished together, there is assurance that their end faces lie in the same plane; and since this is done with their concial portions in engagement, the flush relation of the parts in subsequent assembly in the coupling is effected by simply positioning them so that these concial portions are in abutment, i.e., by means of the spring forces acting on the valve head 14, and the threading of the valve stem 22 in the sleeve 47. In this latter connection, it is preferable that the stem 22 and the sleeve 47 be self-locking, in which case a conventional self-locking element between the threads is employed.

After the individual assemblies are completed, all air and moisture are removed from their interiors. To accomplish this, the assemblies may be heated to eliminate moisture, and evacuated or filled with fluid to remove any air therein; or the assemblies may be connected and flushed. A plurality of openings 83 are provided in the poppet 21, so that any air between the poppet 21 and the body 20 will bleed off.

A unique advantage of the female valve assembly is that if pressure of fluid within the assembly is so great that tensile and bearing forces on the parts tend to deform them, so that the valve stem 22 tends to move forward, the external faces of the poppet 21 and the valve head 23 will remain flush. The reason is that the poppet is restrained from moving to the left by the valve head 23; accordingly, the poppet, due to the interal pressure, will follow the valve, and the valve seal will be maintained.

My invention is characterized by fast action of the various parts in disconnecting the lines coupled thereby. Retraction of the sleeve 77 frees the spring 45 to force the guide 44 and the poppet 21 outwardly. This action effects the reverse movement of the parts as described in locking them together. Due to my unique construction, these actions, though successive, are almost instantaneous. No fluid can spill because when the end faces of the valve head 23 and poppet 21, and the end faces of the valve head 14 and the housing 12 become flush, they are still at the right of the O-ring 25. As they pass the O-ring 25, it wipes the lateral surfaces, as previously described, to prevent the escape of any fluid along such surfaces.

The disengagement of my coupling proceeds as follows: forcing the sleeve 77 to the right against its spring 80 results in the springs 18, 45, 50 propelling the guide 44, the poppet 21 and the housing 12 to the left, so that shoulder of the housing 12 in the groove 12′ cams the balls 75 radially outward.

After the balls are released, the only parts in motion are the housing 12, the poppet 21 and the guide 44. When the poppet 21 in its movement to the left contacts the valve head 23, thus closing both valve parts, it operates through the valve head 23 and valve stem 22 to force the sleeve 47 to the left. The pin 48, of course, remains in contact with the shoulder 35, due to the action of the spring 50. Thus, there is relative movement between the sleeve 47 and the shaft 61, whereby the locking balls 65 are cammed radially outward to engage the circumferential shoulder at the rear of the guide 44.

As the sleeve 47 continues to move to the left, while the shaft 61 remains stationary, the portion of the shaft 61 to the left of the groove 67 is disposed adjacent the openings in the sleeve 47 in which the balls 65 are located. This causes the balls 65 to be locked between the outer diameter of the shaft 61 and the circumferetial shoulder of the guide 44. The valve head 23 is locked against its seat, and the valve head 14 is returned to its seat.

The balls 65 roll within these restraining diameters until the right face of the slot 47′ in the sleeve 47 bottoms against the pin 48, after which the pin 48 and the shaft 61 are carried to the left. After the pin 48 and the shaft 61 have been translated a short distance, the housing 12, which has been leaving the female housing 20, passes out of the O-ring 25 while the poppet 21 enters it. The poppet 21 continues to the left until the legs 70′ of the guide 44 bottom against the radial shoulder of the housing 20.

It will be apparent from the foregoing that while I have illustrated and described a preferred structure, various modifications may be made therein without departing from the spirit and scope of my invention. Accordingly, I do not intend that my invention be limited, except as by the appended claims.

I claim:
1. A coupling assembly comprising:
 a pair of co-axial valve members having parallel end faces, the end face of one valve member being no larger than the end face of the other valve member;
 respective housings of the same outer dimensions surrounding the valve members, said one valve member and its housing having cooperable conical surfaces extending from their ends to prevent movement of said one valve member inwardly of its housing, said other valve member and its housing having cooperable conical surfaces extending from their ends to prevent movement of said other valve member externally of its housing;
 a sleeve surrounding and supporting the housing for said one valve member so that it is slidable in said sleeve;
 means in the other housing normally biasing said other valve member therein to a position wherein its end face is in the same plane as the end face of one end of said other housing;
 means in said one housing normally biasing said one housing and said one valve member therein with the end faces of said one valve member and one end of said one housing are in the same plane, said biasing means in each housing cooperating, upon pressing said end faces together and forcing one against the other, to effect unitary movement of said housings and valve members for a predetermined distance, and then permitting the valve members to remain stationary while the housings move relative thereto; and
 a sealing member in said sleeve normally surrounding and engaging said one housing a distance from its outer end less than said predetermined distance, whereby the housings and their members do not undergo relative movement until said member engages said other housing.
2. In a coupling mechanism, the combination of:
 a housing having a central bore;
 a poppet in said housing slidable in one end of said bore, said poppet having a central opening which at its outer end is a conical portion wherein the inner end is the smaller;
 a valve stem in said poppet having a mating conical end in the conical portion of said central opening, the end face of said conical end being flush with the outer end of said poppet;
 a sleeve secured to the inner end of said valve stem, said sleeve having a circumferential row of openings located between its ends;
 a guide element slidable on said sleeve having a recess about said row of openings, said guide element being in the path of said poppet;
 a shaft slidable in said sleeve, said shaft having a circumferential groove intermediate its ends;
 ball elements in the openings in said row, said guide element upon movement inwardly moving the ball elements, and hence the sleeve, therewith until the ball elements reach said groove, whereupon the ball elements enter said groove to permit said guide element to undergo further movement along said sleeve;
 bias means interconnecting said housing, said guide element and said shaft, said bias means normally urging said guide element, and hence said poppet, to an outer position; and
 stop means adjacent said one end of said housing to limit the outer position of said poppet.
3. The combination defined in claim 2, wherein said shaft includes a radial slot therethrough adjacent its inner end; a pin extending through said slot; a compression spring in said bias means operating to urge said guide element and said pin apart; stop means in said housing to limit the innermost position of said pin, and hence said shaft; and a further compression spring in said bias means operating to urge said guide element toward said one end of said housing.
4. The combination defined in claim 2, wherein said housing includes an inner groove intermediate said one end and said limit means for the poppet; and a seal element in said inner groove, said seal element protruding from said inner groove throughout its length, said seal in the normal position of said poppet being in sealing engagement with the poppet.

5. The combination defined in claim 4, further including a valve member formed of a stem having an enlarged head that is conical, the end of said conical head being the smaller end of said head;
- a housing for said valve member having a bore which at one end is conical and adapted to matingly engage said head, the ends of said housing and said head being flush, said housing being the same size as said poppet and adapted to engage said poppet and be moved therewith past said seal element; and
- means for locking said housings together in the position in which the engaging ends of said poppet and the housing for said valve member are inwardly of said seal element.

6. The combination defined in claim 5, said valve member housing including an outer circumferential groove spaced from the end thereof, said housing for the poppet including a circumferential row of openings outwardly of said seal element; a sleeve surrounding said poppet housing; spring means biasing said sleeve to an outer position on said poppet housing wherein said sleeve overlays said row of openings in the poppet housing; and ball element in said row of openings in the poppet housing, said ball elements being adapted to enter the groove in said valve member housing.

References Cited in the file of this patent

UNITED STATES PATENTS

| | | |
|---|---|---|
| 1,329,827 | Crittall | Feb. 3, 1920 |
| 1,677,432 | Croning | July 17, 1928 |
| 2,254,997 | Fisher | Sept. 2, 1941 |
| 2,279,146 | Schneller | Apr. 7, 1942 |
| 2,310,073 | Greig | Feb. 2, 1943 |
| 2,319,015 | Speth | May 11, 1943 |
| 2,449,938 | Hansen | Sept. 21, 1948 |
| 2,451,218 | Hengst | Oct. 12, 1948 |
| 2,451,441 | Main | Oct. 12, 1948 |
| 2,545,796 | Scheiwer | Mar. 20, 1951 |
| 2,648,548 | Scheiwer | Aug. 11, 1953 |
| 2,714,518 | Balass | Aug. 2, 1955 |
| 2,823,048 | Hansen | Feb. 11, 1958 |
| 2,951,713 | Hoffstrom | Sept. 6, 1960 |

FOREIGN PATENTS

| | | |
|---|---|---|
| 318,678 | Switzerland | Feb. 28, 1957 |
| 715,383 | Great Britain | Sept. 15, 1954 |